US006965575B2

(12) United States Patent
Srikrishna et al.

(10) Patent No.: US 6,965,575 B2
(45) Date of Patent: Nov. 15, 2005

(54) SELECTION OF ROUTING PATHS BASED UPON PATH QUALITY OF A WIRELESS MESH NETWORK

(75) Inventors: Devabhaktuni Srikrishna, San Mateo, CA (US); Amalavoyal Chari, San Mateo, CA (US)

(73) Assignee: Tropos Networks, Sunnyvale, CA (US)

( * ) Notice: Subject to any disclaimer, the term of this patent is extended or adjusted under 35 U.S.C. 154(b) by 130 days.

(21) Appl. No.: 10/602,439

(22) Filed: Jun. 24, 2003

(65) Prior Publication Data

US 2004/0008663 A1 Jan. 15, 2004

Related U.S. Application Data

(63) Continuation-in-part of application No. 09/751,262, filed on Dec. 29, 2000, now Pat. No. 6,704,301.

(51) Int. Cl.[7] .............................................. H04J 1/16
(52) U.S. Cl. ...................... 370/252; 370/238; 370/351; 370/401
(58) Field of Search ................................ 370/238, 255, 370/328, 338, 400, 401, 351, 252, 410

(56) References Cited

U.S. PATENT DOCUMENTS

| | | | |
|---|---|---|---|
| 5,452,294 A * | 9/1995 | Natarajan ................... 370/351 |
| 5,563,881 A | 10/1996 | Perelman et al. |
| 5,740,366 A | 4/1998 | Mahany et al. |
| 5,987,011 A * | 11/1999 | Toh ............................. 370/331 |
| 6,046,992 A * | 4/2000 | Meier et al. ................. 370/338 |
| 6,130,881 A * | 10/2000 | Stiller et al. ................. 370/238 |
| 6,298,053 B1 | 10/2001 | Flammer, III et al. |
| 6,349,090 B1 * | 2/2002 | Lewis et al. ................. 370/238 |
| 6,400,702 B1 * | 6/2002 | Meier ......................... 370/338 |
| 6,426,945 B1 * | 7/2002 | Sengodan .................... 370/238 |
| 6,535,498 B1 * | 3/2003 | Larsson et al. ............. 370/338 |
| 6,549,786 B2 * | 4/2003 | Cheung et al. ............. 455/524 |
| 6,704,283 B1 * | 3/2004 | Stiller et al. ................. 370/238 |
| 6,735,178 B1 * | 5/2004 | Srivastava et al. .......... 370/252 |
| 6,744,740 B2 * | 6/2004 | Chen ........................... 370/255 |
| 6,754,192 B2 * | 6/2004 | Kennedy ..................... 370/331 |

* cited by examiner

Primary Examiner—Ricky Ngo
Assistant Examiner—Nittaya Juntima
(74) Attorney, Agent, or Firm—Brian R. Short

(57) ABSTRACT

The invention includes an apparatus and method for determining an optimal route based upon path quality of routes to an access node of a wireless mesh network. The method includes receiving routing packets at the access node through at least one wireless route. Each routing packet includes route information that identifies the wireless route of the routing packet. A success ratio of a number of successfully received routing packets versus a number of transmitted routing packets is determined over a period of time T1, for each wireless route. The wireless route having a greatest success ratio is first selected, as are other wireless routes that have success ratios within a predetermined amount of the greatest success ratio.

24 Claims, 9 Drawing Sheets

SELECTION OF ROUTING PATHS BASED UPON PATH QUALITY OF A WIRELESS MESH NETWORK

RELATED PATENT APPLICATIONS

This patent application is a continuation-in-part of patent application Ser. No. 09/751,262 filed on Dec. 29, 2000, and issued as U.S. Pat. No. 6,704,301 on Mar. 9, 2004, which is herein incorporated by reference.

FIELD OF THE INVENTION

The invention relates generally to wireless communications. More particularly, the invention relates to a method and apparatus of selection of routing paths based upon path quality of a wireless mesh network.

BACKGROUND OF THE INVENTION

Packet networking is a form of data communication in which data packets are routed from a source device to a destination device. Packets can be networked directly between a source node and a destination node, or the packets can be relayed through a number of intermediate nodes.

A wireless network can include a wireless device being connected to a network through a base station that is wired to the network. The wireless device can transmit data packets that are received by the base station and then routed through the network. The wireless network can include many base stations that are each wired to the network.

FIG. 1 shows a prior art mesh network. A shown in FIG. 1, each client A–E 110–150 is required to maintain a full tree 125, to access each client and each server to which the client 120 can gain access. This is disadvantageous because it requires a large memory, which expands as the network expands.

It is desirable to have a wireless mesh network that can continually analyze the quality of routing paths through the wireless mesh network, and select an optimal path from among all available routing paths.

SUMMARY OF THE INVENTION

The invention includes an apparatus and method for analyzing a quality of routing paths of a wireless network, and selecting an optimal path from among all available routing paths.

An embodiment includes a method of determining an optimal route based upon path quality of routes to an access node of a wireless mesh network. The method includes receiving routing packets at the access node through at least one wireless route. Each routing packet including route information that identifies the wireless route of the routing packet. A success ratio of a number of successfully received routing packets versus a number of transmitted routing packets is determined over a period of time T1, for each wireless route. The wireless route having a greatest success ratio is first selected, as are other wireless routes that have success ratios within a predetermined amount of the greatest success ratio. Of the first selected routes, routing packets are at the access node through the first selected routes. Again, each routing packet including route information that identifies the wireless route of the routing packet. A success long ratio of a number of successfully received routing packets versus a number of transmitted routing packets is determined over a period of time T2, wherein T2 is substantially greater than T1, for each first selected route. The wireless route having a greatest success long ratio are second selected, as are other wireless routes that have success long ratios within a second predetermined amount of the greatest success long ratio. The second selected routes having a greatest throughput are third selected. An optimal wireless route based upon the third selected routes is determined.

Other aspects and advantages of the present invention will become apparent from the following detailed description, taken in conjunction with the accompanying drawings, illustrating by way of example the principles of the invention.

DETAILED DESCRIPTION

Figure 1:
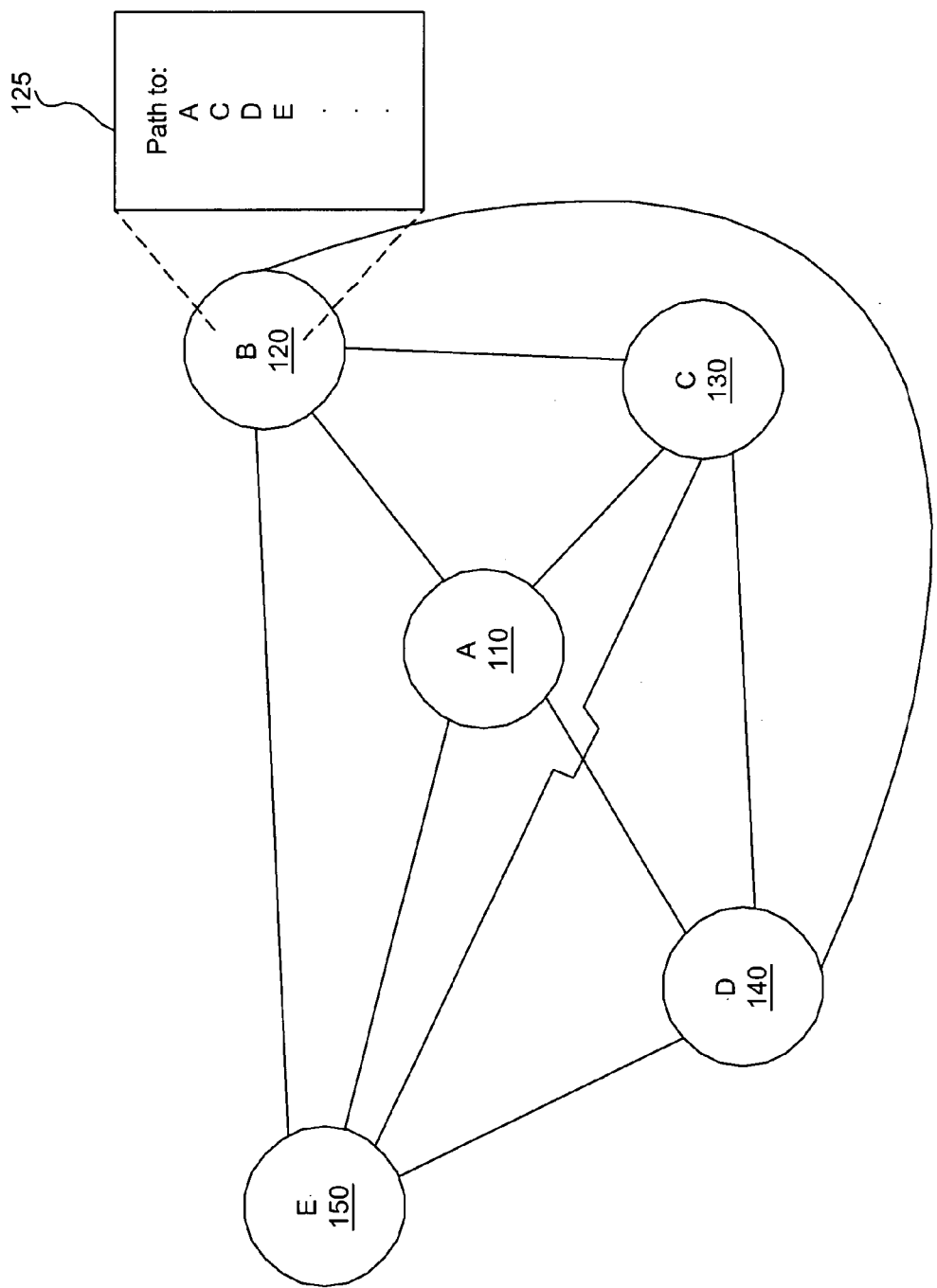
FIG. 1 shows a prior art mesh network.

As shown in the drawings for purposes of illustration, the invention is embodied in an apparatus and method for analyzing a quality of routing paths of a wireless network, and selecting an optimal path from among all available routing paths.

Figure 2:
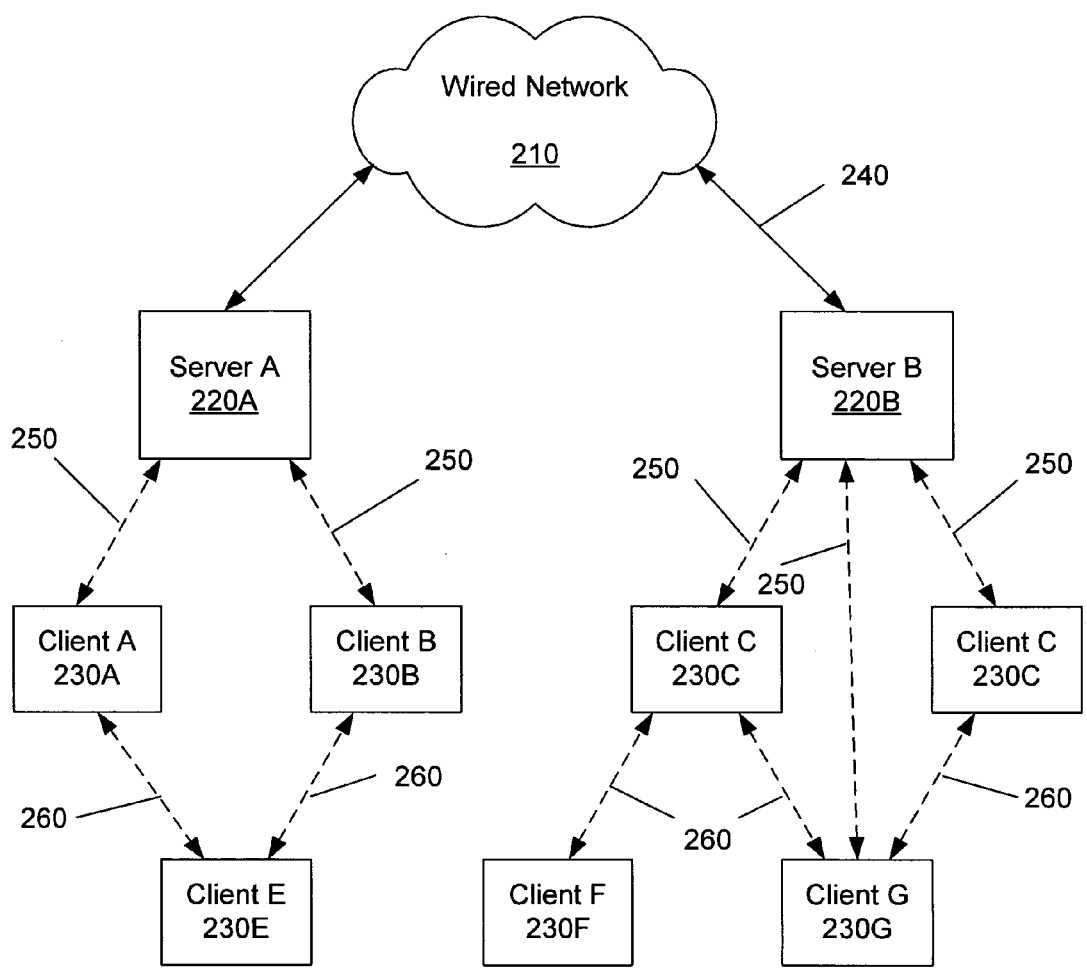
FIG. 2 shows a wireless network that can include embodiments of the invention.

FIG. 2 shows a wireless network that can include embodiments of the invention.

The present invention provides a scalable routing solution that uses bandwidth efficiently, adapts quickly to changes in network topology and connectivity, is self-administering, easily deployable, automatically partitions the network in order to optimally exploit available wired connections and is easy to implement. The network architecture includes one or more wired gateways that can be simultaneously members of the wireless network and the (wired) Internet. Additionally, the network architecture can include a large number of access nodes that are members of the wireless network and have access to the wired Internet only through the gateways. For one embodiment, the number of gateways is limited (perhaps 1 gateway for every 100 access nodes) and the access nodes can gain access to a gateway that provides the access nodes with Internet access, email, etc. This system also permits, for one embodiment, client-to-client (through access nodes) communication.

The gateway periodically sends out a beacon to the access nodes. The access nodes then rebroadcast the beacon. This permits each access node to determine its path to the gateway. For one embodiment, a reverse beacon is sent by the access nodes back to the gateway. Thus, the gateway has a full path to each access node, and each access node has a path to its nearest neighbors (gateway or access nodes), and knows which of those paths leads to the gateway. Therefore, the access node and the gateway can communicate. For one embodiment, if an access node needs to be connected to the Internet via the gateway, the access node sends a request to the next access node upstream from the access node. The request of the access nodes requests that it be passed along to the gateway. The gateway is able to send a message to any access node as well.

For another embodiment, when an access node wishes to connect the gateway, it sends a connection request, through the known path to the gateway. This connection request includes the known path to the gateway. When the gateway receives the request, it becomes aware of the path to the requesting access node, as well as all intervening nodes. The gateway uses this information to respond to the request, and add the data to its routing table/access node tree.

In this system, each access node elects to be part of a separate set of access nodes served by a single gateway. These sets of access nodes are referred to as clusters. Thus, the network automatically partitions itself into multiple clusters, one for each gateway. This is advantageous, since each gateway need only address a subset of the access nodes. This optimizes gateway capacity among the clusters, and decreases response delay experienced by the access nodes.

FIG. 2 is a network diagram of one embodiment of the current connection structure. The wired network 210, for one embodiment is the Internet. Gateways 220A, 220B are coupled to the wired network 210, through a wired connection 240, for one embodiment. Alternatively, the gateways 220A, 220B may be coupled to the network 210 via another type of high bandwidth connection.

Access nodes 230A–230E are coupled to the gateways 220A–B, either directly or indirectly, through connections 250, 260. For one embodiment, connections 250, 260 are wireless connections. For another embodiment, the connections may be wired connections, or other types of connections. For one embodiment, there are a certain number of first level access nodes 230, which are coupled directly 250 to gateways 220. Other access nodes 230 are coupled to the gateway 220 through one or more intermediate access nodes.

When a gateway 220 broadcasts a beacon, the beacon is received by all first-level access nodes. The beacon is used to establish a route from each access node to the gateway. First level access nodes are defined by the fact that they receive data directly from the gateway. The first level access nodes re-broadcast the beacon data, attaching their own data to it. This indicates to the second level access nodes that the path to the gateway includes the first level access node. This will be described in more detail below.

For one embodiment, the link quality of the beacon received determines whether that beacon is rebroadcast by the system. If the quality of the beacon is above a determined threshold, it is rebroadcast. Otherwise, it is not. For one embodiment, link quality is determined by persistence, i.e. the number of times in the last several routing cycles that the particular beacon was received. For one embodiment, the link quality reflects a reliability that a path to the gateway shown by the beacon will be available for a reasonable time. The link quality is determined by continuously monitoring the beacons as they are received in every cycle. Whenever the beacon is not received in a cycle, the link quality associated with that path is decreased. The beacon is only transmitted if its link quality is sufficiently high.

For another embodiment, the depth of re-broadcast is determined for the system. Thus, for example, a access node may rebroadcast a beacon only if there are 5 or fewer hops between the access node and the gateway. For another embodiment, other link quality factors, such as traffic congestion, battery status of upstream access nodes, thickness of the pipeline, backend (i.e. gateway) capacity, latency, or other factors may be used to determine whether the beacon should be rebroadcast.

After a beacon has been received by every access node, every access node has the address of an upstream access node, which leads to the gateway. For one embodiment, each access node also has a path to the gateway. A reverse beacon is then sent out through the access nodes, up to the gateway. The reverse beacon permits the gateway to establish a full access node tree, enabling the gateway to access all access nodes. Furthermore, the reverse beacon informs each access node what downstream nodes access the gateway through this access node.

Each access node has at least one upstream node, and may have a plurality of downstream nodes. Upstream nodes are the nodes that are between the access node and the gateway. For a Level One access node, there is only one upstream node, the gateway. For a Level Four access node, there are four upstream nodes, which define the access node's path to the gateway. Downstream nodes are nodes that receive the beacon from a particular access node, and define their path to the gateway through that access node. Thus, for example, in a single branch that is: Gateway-A-B-C-D-E-F-G, for access node D, the upstream nodes are C, B, A, Gateway, while the downstream nodes are E, F, and G.

For another embodiment, the reverse beacon need not be sent. Not sending the reverse beacon means that the gateway can not initiate sending a message to a access node. Rather, the gateway must wait for a request from the access node. That request includes a path to the access node. Also, the only method of access node-to-access node communication in such a system is by sending the message through the gateway. In some wireless systems this is sufficient because access to the gateway—which provides access to the general Internet—is the primary use.

Although only a limited number of gateways 220 and access nodes 230 are shown in FIG. 2, it should be understood by one skilled in the art that an almost unlimited numbers of access nodes 220, at almost unlimited number of hops from the gateways 220 may be implemented. For one embodiment, the gateway capacity determines the number of access nodes that may be coupled to the gateway. Thus, for example, if the gateway can handle 10 simultaneous connections to various access nodes, then up to 100 access nodes may be coupled to the gateway. This indicates that no more than 1-in-10 access nodes access the gateway at any one time. This assures that the access nodes never have to wait for the gateway. Depending on the latency that is acceptable, which varies by function (e.g. voice v. data latency), the gateway may support a certain number of access nodes of each function.

The gateway plays a central role in the discovery of routes by the Access nodes. At periodic intervals, the gateway originates a "beacon" which is broadcast to all access nodes within hearing range of the gateway. The time interval between successive broadcasts of the beacon defines a routing cycle. The beacon is a routing packet—a short data packet that contains the address of the gateway. For one embodiment, the beacon includes the following information: (1) a sequence number which identifies which routing cycle it initiates, 2) the address (MAC or IP) of the gateway, 3) a Traffic Monitoring Code (TMC). For one embodiment the TMC may be omitted. For one embodiment, the address of the gateway may be included only in the ethernet header or IP header of the beacon message.

For one embodiment, the gateway may add a hop-count counter set to 0. This hop point counter would be incremented by each access node that rebroadcasts the beacon. This permits the receiving access node to determine how many hops from the gateway it is.

For one embodiment, the beacon may contain only the sequence number of the message. All other relevant information may be captured in the ethernet-level header and/or IP headers of the message.

The beacon is received by all access nodes within direct receiving range of the gateway. For one embodiment, in FIG. 3A, this is shown as access nodes A 310 and H 330. For one embodiment, there is a means to ensure that the broadcast transmission is received. This will be discussed in more detail below. All such access nodes 310, 330, which are one hop from the gateway, are referred to as being at Level One with respect to the gateway 300.

On receipt of the beacon, each Level One Access node 310, 330 has a path to connect to the gateway 300. For one embodiment, each of the Level One access nodes 310, 330 has the following data: (1) its connectivity to the gateway, (2) a means to gain access to the gateway (since it now knows the address of the gateway and can direct transmissions to it), 3) the TMC of the gateway. After a small delay, each Level One access node 310, 330 rebroadcasts the beacon, after appending to the beacon its own address and TMC. For one embodiment, the delay is a random delay, such that not all Level One Access nodes broadcast at the same time. For one embodiment, the TMC data may be omitted. For one embodiment, the access node may only increment a hop-count counter of the received beacon before rebroadcasting it. For another embodiment, the access node may rebroadcast the beacon unaltered.

For one embodiment, the rebroadcast beacon now contains (1) the sequence number, (2) the address of the gateway and its TMC, (2) the address of the Level One Access node and its TMC. Alternatively, the beacon may only include a hop-count, and/or a sequence number.

This beacon is now received by all access nodes that are two hops from the gateway (Level Two Access nodes) 330, 360. On receipt of the beacon, each Level Two Access node 315, 335 now knows, for one embodiment, (1) that it has connectivity to the gateway, (2) an explicit route to the next upstream access node (the Level One Access node whose broadcast it received), 3) the full path to the gateway through the upstream Level One Access node and 4) the TMCs of the gateway and the Level One Access node from whom the broadcast was received. For one embodiment, each Level Two Access node now knows (1) that it has connectivity to the gateway and (2) an explicit route to the next upstream access node. For one embodiment, each Level Two Access node knows the number of hops to the Gateway 300 through the next upstream access node.

It may happen that a Level Two Access node 315, 335 may receive beacon rebroadcast from two or more Level One Access nodes. In this case, it will select one of the two proffered routes, and reject the other(s). For one embodiment, the route that has the best link quality is selected. As described above, the link quality, for one embodiment, includes the persistence of the beacon. For one embodiment, it may further include other link quality factors. For another embodiment, the route selected will be the one corresponding to the first heard rebroadcast, so that this scheme may be named 'First-Heard Path Routing'. In another embodiment, described in more detail below, the TMC may be used to evaluate expected latency, and the path with the lowest latency may be selected.

It may also happen that one of the Level One Access nodes (say A) 310 may receive the broadcast of one of the other Level One Access nodes (say H) 330. Access node A 310, because it is at Level One, already knows a route to the gateway. On examining the sequence number of the transmission it receives from H 330, it knows to ignore this routing update, as it already has a current route with that sequence number.

Each access node at Level Two now rebroadcasts the beacon. For one embodiment, it rebroadcasts the beacon after having appended its address and TMC to the beacon. For one embodiment, it rebroadcasts the beacon after having incremented the hop-count of the path back to the gateway. For another embodiment, it rebroadcasts the Beacon unaltered. As discussed above, this optimal path or optimal beacon may be selected based on link quality, priority in receiving the beacon, or based on another evaluation. By iteration of this process at each Level, each access node that has connectivity to the Gateway (i.e., that can link to the gateway through functional links potentially mediated by other access nodes) becomes aware of its own connectivity to the gateway. For one embodiment, each access node knows a complete path to the gateway. For another embodiment, each access node knows only the next upstream access node on way to the gateway.

For one embodiment, the access nodes only rebroadcast the beacons up to a specified Level. Thus, for example, a access node that has more than ten hops to the gateway would not rebroadcast. In this instance, if a access node is outside of the acceptable latency range of a gateway, it may not receive a path to the gateway. This may be indicated to the user, such that the user can either use an alternative means, or move the access node. Since these systems are for wireless broadcast, this is the equivalent of being out of range. A mobile device may be moved back into range. Since the beacons are rebroadcast periodically, the next time that the wireless device is within range of a beacon, it would again receive a path to the gateway.

For one embodiment, each access node stores its discovered path to the gateway in a temporary memory. For one embodiment, each access node only stores the address of its default gateway, the next upstream access node, in memory.

When the reverse beacon is received, the access node further learns all of the downstream access nodes whose routes to the gateway pass through this particular access node. For one embodiment, the access node also stores this information. For one embodiment the upstream and downstream paths are stored in a temporary memory. For one embodiment, the temporary memory is a route table. For another embodiment, the temporary memory may be a cache. It is to be noted that the size of the temporary memory is of the order of the number of access nodes connected to a particular access node downstream, and the data of the upstream access node which leads the access node to the gateway. For another embodiment, the data in the memory is the actual path to the gateway, and the size of the memory is of the order of the length of the path to the gateway (number of hops to the gateway). This is very small compared with traditional distance-vector protocols, link-state protocols, or their variants where the length of the routing table is of the order of the number of nodes (access nodes) in the network. For instance, assuming a uniform density of nodes, the size of the path that needs to be stored in a Access node's memory is of the order of the square root of N, where N is the number of nodes.

The above-described method illustrates how nodes in the network (access nodes) receive up-to-date information about their connectivity to the gateway and a means to reach the gateway.

Figure 3A:
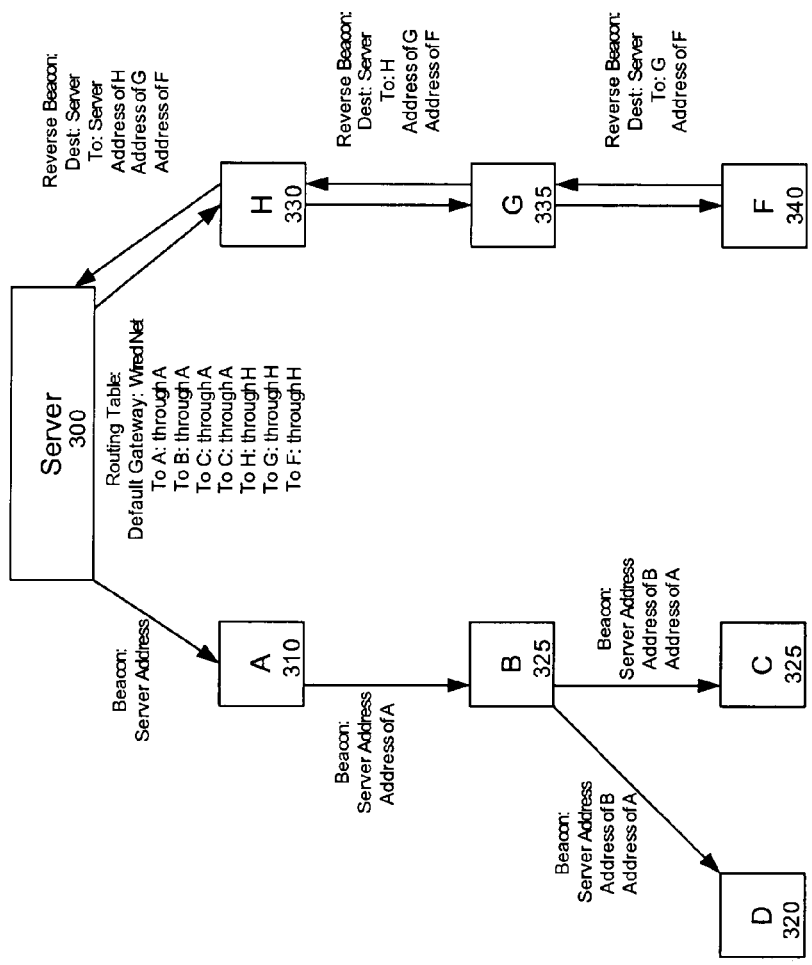
FIG. 3A shows another wireless network that can include embodiments of the invention.

In the system of FIG. 3A, a reverse beacon is used to permit the gateway to receive data to set up a full (two-way) routing path. For one embodiment, the reverse beacon is sent when the gateway sends a dummy reverse beacon, initiating it. For another embodiment, the reverse beacon is initiated when the access node wishes to initiate communication with the gateway.

In one embodiment, the access node, in response to the dummy reverse beacon, when it wishes to initiate communication, or upon receiving the beacon, initiates a downstream route setup procedure (DRS). The DRS will request that the gateway setup routes in its own routing table. The access node node initiates a downstream route setup packet, for one embodiment, to its default gateway, asking it to forward the packet to the gateway. The default gateway is the next upstream node from the access node. The default gateway for a Level One access node is the gateway. The default gateway is the next upstream Access node that the access node uses to communicate with the gateway. It can be reset every time a beacon is received.

The default gateway, upon receiving this DRS packet appends its IP address to the DRS packet, forwards it to its gateway, and sets up a route to the downstream access nodes whose addresses were included in the DRS in its routing table. This process continues, until the packet reaches the gateway. This path is used by the gateway to set up downstream routes to reach the access nodes along the path. For another embodiment, instead of sending only IP addresses, the reverse beacon includes a list of links, i.e. the relationship between the various access nodes in the branch. This will be discussed in more detail below.

For another embodiment, each node periodically initiates a reverse beacon broadcast. This period is the KEEPALIVE period. For one embodiment, the timing of the start of the period is jittered, such that not all nodes initiate the reverse beacon at the same time. The reverse beacon includes a From address, the address of the initiating node, and a To address, which is the address of the node's default gateway. The node's default gateway, on receiving this reverse beacon adds the route to the initiating node to its routing table. It then passes on the reverse beacon after having added its address to it, as described above. Each access node sends a single reverse beacon in each cycle, and aggregates other reverse beacons in the interim. Thus, if a access node receives three reverse beacons, when it is time for the access node to send its reverse beacon, it sends a single beacon to its default gateway, including all of the data from the three reverse beacons it received.

Figure 3B:
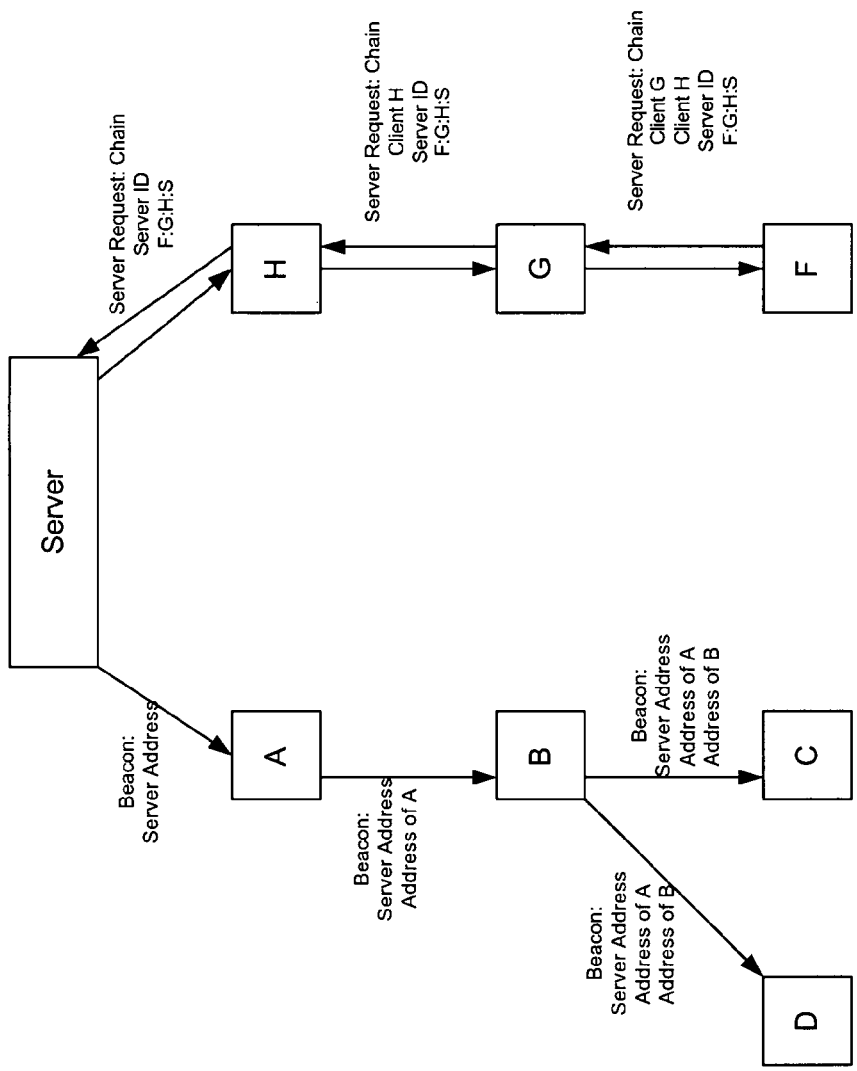
FIG. 3B shows another wireless network that can include embodiments of the invention.

FIG. 3B illustrates an alternative method of initiating communication with the gateway. When an access node wishes to initiate communication with the gateway, to establish an http connection or the like, it accesses its temporary memory for the current route to the gateway. The current route might read, for instance, F->G->H->S, where F labels the access node seeking to initiate communication with the gateway S.

Access node F sends an Initiation Request (IR) to access node G. For one embodiment, the IR is a data packet that contains the path (F->G->H->S) in addition to a request addressed to the gateway S to initiate a connection. Access node G uses the path information contained in the IR to figure out whom to forward this packet to. In this example, access node G forwards the packet without change to access node H. Access node H then forwards it to the gateway S. On receipt of the IR, the gateway knows how to get back to Access node F, since it received the path F->G->H->S. The gateway acknowledges receipt of the IR to access node F via the path (S->H->G->F). A two-way connection can be set up at this point.

It should be emphasized that, at the end of a routing cycle, each access node that is currently part of the network knows its default gateway, which leads to the gateway. The access node further is aware, for one embodiment, of all access nodes downstream from it that use this access node to reach the gateway.

For another embodiment, the access node may know its entire route. For example, Access node X's route might read (X->B->L->D->S). Furthermore, for one embodiment, Access nodes only know their own branch, i.e. its default gateway to the gateway, the path to the gateway, and the nodes downstream from it that use this access node to access the gateway. This is to be viewed as a strength of the proposed routing protocol—in a network architecture wherein access nodes seek to communicate with a gateway that controls access to a wired Internet, peer-to-peer connectivity is generally unnecessary. The larger the number of links or paths that need to be maintained by each access node, the more complex and harder to implement the protocol becomes, and the more wasteful it is of bandwidth. Thus, the advantage of reduced bandwidth and memory requirements outweighs the disadvantage of not having each access node have a routing table that includes every other access node. For one embodiment, as will be described in more detail below, the gateway has a path to each of the access nodes. Thus, access node-to-access node connectivity may be established through the gateway.

Figure 4:
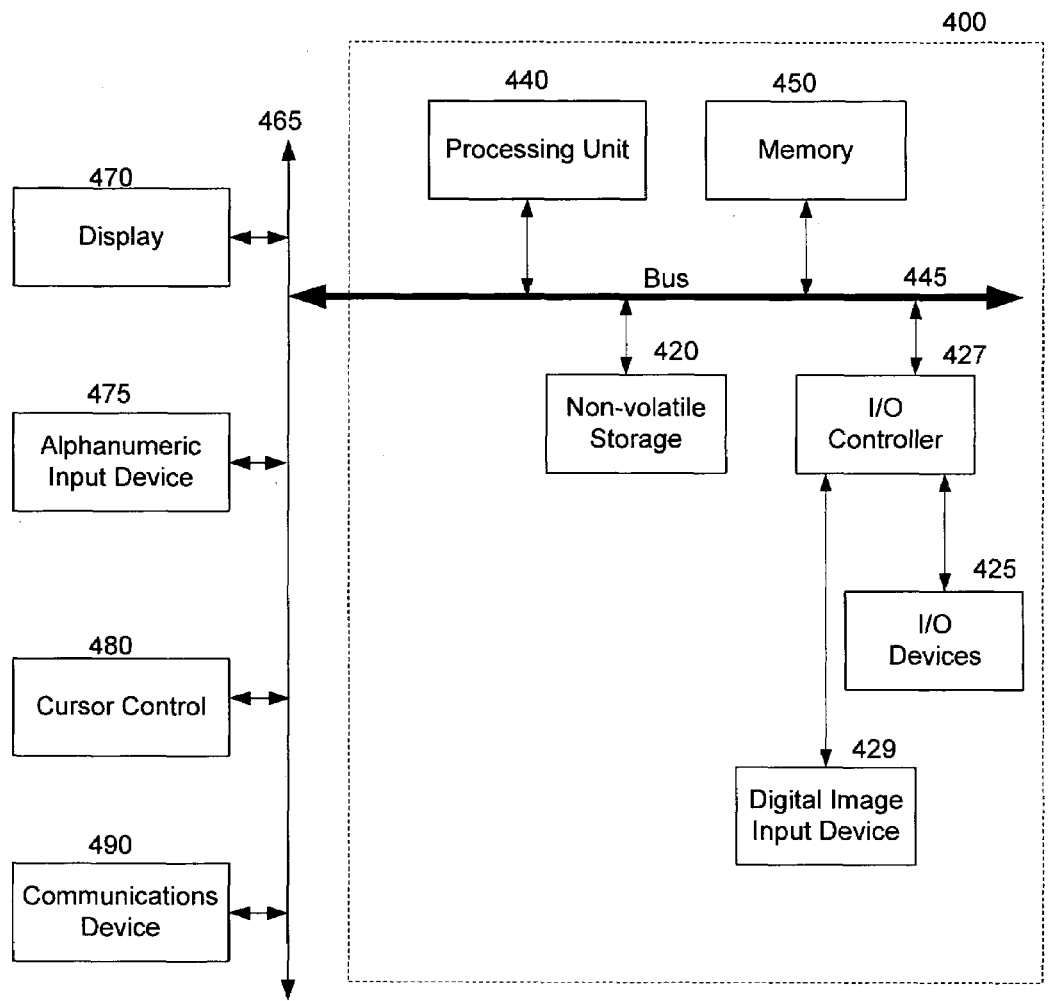
FIG. 4 shows an access node according to an embodiment of the invention.

FIG. 4 shows an access node according to an embodiment of the invention. It will be apparent to those of ordinary skill in the art, however that other alternative systems of various system architectures may also be used.

The data processing system illustrated in FIG. 4 includes a bus or other internal communication means 445 for communicating information, and a processor 440 coupled to the bus 445 for processing information. The system further comprises a random access memory (RAM) or other volatile storage device 450 (referred to as memory), coupled to bus 445 for storing information and instructions to be executed by processor 440. Main memory 450 also may be used for storing temporary variables or other intermediate information during execution of instructions by processor 440. The system also comprises a read only memory (ROM) and/or static storage device 420 coupled to bus 440 for storing static information and instructions for processor 440, and a data storage device 425 such as a magnetic disk or optical disk and its corresponding disk drive. Data storage device 425 is coupled to bus 445 for storing information and instructions.

The system may further be coupled to a display device 470, such as a cathode ray tube (CRT) or a liquid crystal display (LCD) coupled to bus 445 through bus 465 for displaying information to a computer user. An alphanumeric input device 475, including alphanumeric and other keys, may also be coupled to bus 445 through bus 465 for communicating information and command selections to processor 440. An additional user input device is cursor control device 480, such as a mouse, a trackball, stylus, or cursor direction keys coupled to bus 445 through bus 465 for communicating direction information and command selections to processor 440, and for controlling cursor movement on display device 470.

Another device, which may optionally be coupled to computer system 430, is a communication device 490 for accessing other nodes of a distributed system via a network. The communication device 490 may include any of a number of commercially available networking peripheral devices such as those used for coupling to an Ethernet, token ring, Internet, or wide area network. Note that any or all of the components of this system illustrated in FIG. 4 and associated hardware may be used in various embodiments of the present invention.

It will be appreciated by those of ordinary skill in the art that any configuration of the system may be used for various purposes according to the particular implementation. The control logic or software implementing the present invention can be stored in main memory 450, mass storage device 425, or other storage medium locally or remotely accessible to processor 440. Other storage media may include floppy disks, memory cards, flash memory, or CD-ROM drives.

It will be apparent to those of ordinary skill in the art that the methods and processes described herein can be implemented as software stored in main memory 450 or read only memory 420 and executed by processor 440. This control logic or software may also be resident on an article of manufacture comprising a computer readable medium having computer readable program code embodied therein and being readable by the mass storage device 425 and for causing the processor 440 to operate in accordance with the methods and teachings herein.

The software of the present invention may also be embodied in a handheld or portable device containing a subset of the computer hardware components described above. For example, the handheld device may be configured to contain only the bus 445, the processor 440, and memory 450 and/or 425. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of the present invention for such a device would be apparent to one of ordinary skill in the art given the disclosure of the present invention as provided herein.

Figure 5:
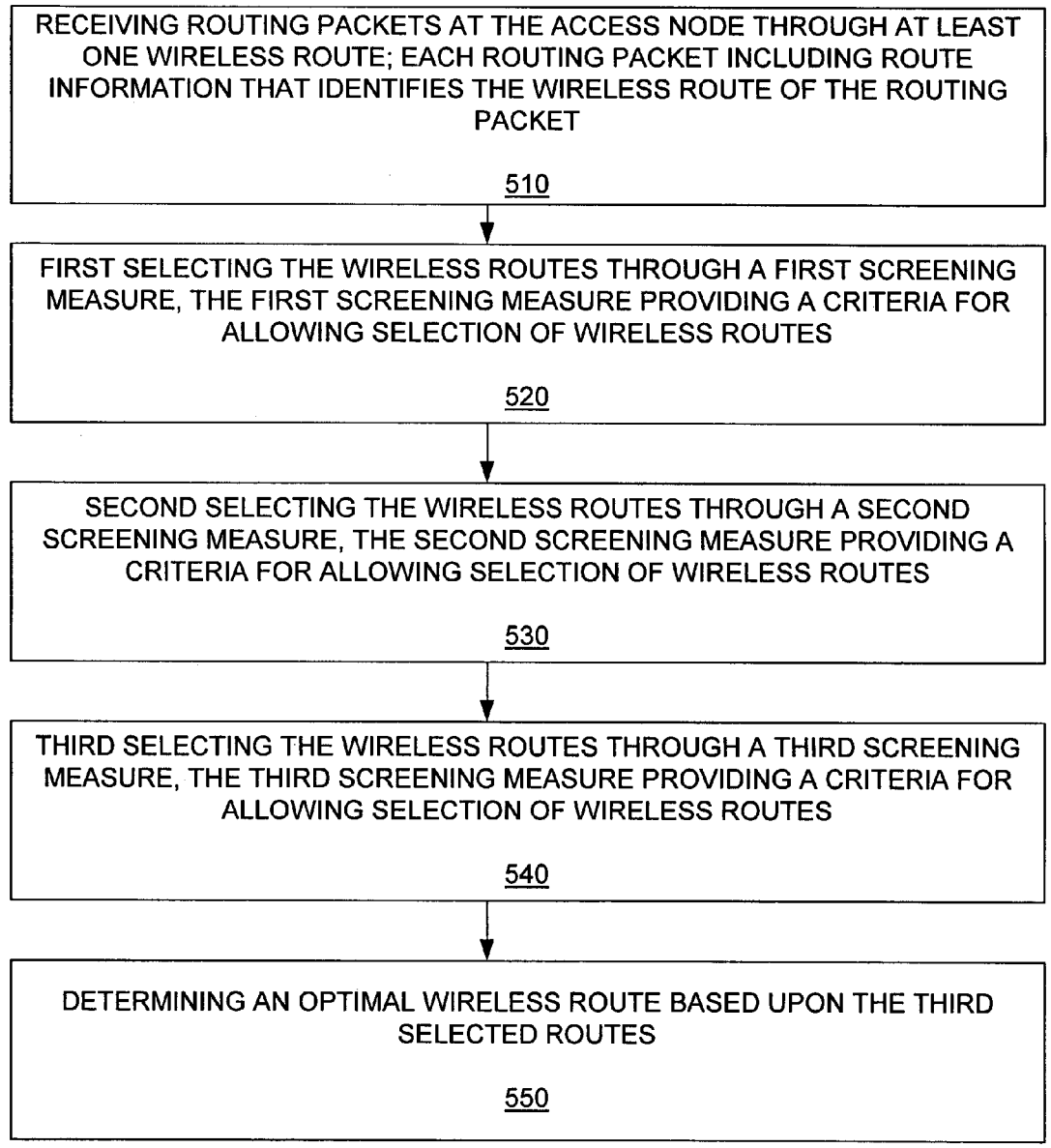
FIG. 5 is a flow chart showing acts according to an embodiment of the invention.

FIG. 5 is a flow chart showing acts according to an embodiment of the invention. The flow chart of FIG. 5 shows the invention in a very general form, and includes several screening processes used to eliminate routes from a set of possible routes. The routes that are left after being screened can be screened additionally, or an optimal route can be selected from the routes that are left after screening.

In the embodiment of FIG. 5, the screening methods (the first, the second and the third) are interchangeable in their order. The order described is an embodiment of invention. Other embodiments can include a different order.

A first step 510 includes receiving routing packets at the access node through at least one wireless route; each routing packet including route information that identifies the wireless route of the routing packet.

A second step 520 includes first selecting the wireless routes through a first screening measure, the first screening measure providing a criteria for allowing selection of wireless routes.

A third step 530 includes second selecting the wireless routes through a second screening measure, the second screening measure providing a criteria for allowing selection of wireless routes.

A fourth step 540 includes third selecting the wireless routes through a third screening measure, the third screening measure providing a criteria for allowing selection of wireless routes.

A fifth step 550 includes determining an optimal wireless route based upon the third selected routes.

Beacon packets are periodically generated at gateways so that within a fixed time interval there is a fixed number of transmitted beacons. The beacons advertise routing paths, and can be received by any access node. The beacons can be lost at any point in a wireless network due to link failures or fading. As the beacons travel through the network by way of rebroadcasts at access nodes, the packet losses (of the beacons) are cumulative. As a result, the number of beacons received at an access node advertising a particular path is generally less than the ideal (loss-less) number of beacons that could possibly be received.

The access nodes can include logic for analyzing the number of beacons received that advertise each of the possible routing paths. This analysis, which generally takes into account the fraction of beacons successfully received for each possible path, on a multiplicity of time scales, determines which of the available paths is the "best" or "optimal" path. Essentially, a routing decision is made. The routing decision of an access node, selects the default gateway of the access node to be the next hop along the selected path. The result is that routes set up through the wireless network correspond to the set of selected optimal paths. Generally, the invention includes methods for allowing access nodes to analyze all advertised routing paths and selecting an optimal path.

The invention includes path evaluation that tracks the set of possible paths, maintains history which can be used to evaluate paths based on criteria related to path availability and throughput. The invention further includes selecting an optimal path.

The path logic of the invention uses reception versus loss of path identifying beacons to characterize the end-to-end path from a wired gateway to each access node. The path selection of each of the access nodes consists of one or more screening processes in which the paths with the best availability, consistency and/or throughput are selected. After the screening processes, an optimal path can be selected.

A first test (as will be described) includes identifying all of the available paths. Each of the possible paths is identified and tracked to determine properties of the path.

A second test (as will be described) includes determining an availability of each path. Among all of the possible paths, some paths can become unavailable due to links becoming unusable. If this condition happens to a path, it can be detected on the basis of recent history, and the path can be eliminated. This availability detection is time critical. This determination can be designated as the availability test or short test (due to the short time period of the test).

A third test (as will be described) includes determining a consistency of each path. Among the paths that have passed the availability screening test, additional screening can include determining paths that have a consistent throughput. Consistency can be defined in terms of variation in latency across a path or equivalently by a ratio of standard deviation to mean for an expected throughput of the path.

Paths that are determined not to be consistent are discarded (screened out). This test can be referred to as the "consistency test" or the "long test." This test is important for maintaining end-to-end throughput because, for example, TCP (and therefore, applications using TCP as a transmission protocol) is very sensitive to jitter. A TCP rate control algorithm reacts adversely to variable latency and path quality, and can even lock up in some cases. In comparison to the availability (short) test, the consistency (long) test is not as sensitive to brief link outages. However, the consistency test can be strongly correlated with both an observed throughput and a perceived availability by the end user due to fluctuations in the throughput. Generally, it is necessary to take a sufficiently long time interval of history in order to make an accurate assessment of consistency (therefore, the name "long test").

A fourth test (as will be described) includes determining a throughput of each path. Generally, once the availability and consistency tests have pre-screened the paths, a path having a maximal expected throughput is selected to maximize the performance of the network. This selection includes a "throughput" test, which will be described. Effects such as self-interference and packet loss impact expected throughput.

A fifth test can include selecting an optimal path after the available paths have been screened by the availability (short) test, the consistency (long) test and the throughput test. The optimal path selection can consider a default path. A default path is generally defined as the last selected path. Generally, the default path is given preference because changing the path from the default path requires extra overhead. That is, once a path is selected, and data packets are being transferred through the default path, extra care is required when changing the selected path from being the default path.

Figure 6:
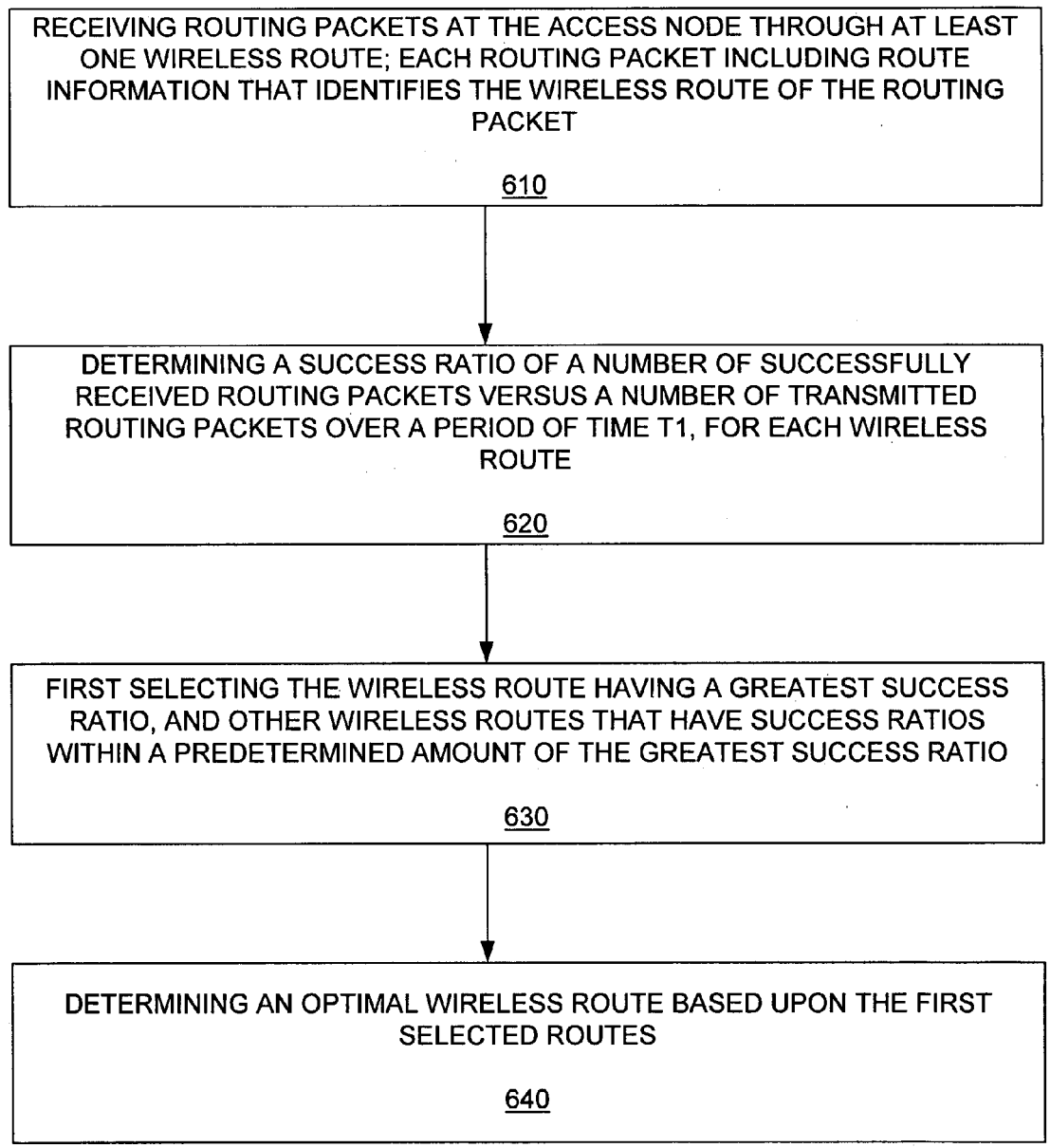
FIG. 6 is a flow chart showing acts according to another embodiment of the invention.

FIG. 6 is a flow chart showing acts according to another embodiment of the invention. The steps included within this embodiment provide a first possible screening of the routes. Generally, this embodiment can be designated as an availability (short) test. The availability test incorporates beacon reception statistics collected over a time interval of length T1. A quality figure QS (quality over the short test interval of T1) is computed to quantify the path quality (of a particular path) over the time interval T1.

The selected availability test paths Ps include the path with the best quality, and other paths within a predetermined amount of quality of the quality of the best path. As described below, the quality can be determined by determining the number of successfully received packet (beacons) versus the number of transmitted packets (beacons). The predetermined amount of quality can be a function of the quality of the best path. A best path can be defined as the path Ps in which no other available path Pj exists such that QS(Pi) is greater than QS(Pj), where QS( ) is defined as the quality of the path. As will be described, the quality can be determined by determining a ratio of the number of successfully received packets versus the number of transmitted packets. Mathematically, the selection of paths can be expressed as the paths Pi having short quality figures QS(Pi) that are greater than QS(Ps)−f(QS(Ps)) where f(QS(Ps)) is a function of the quality of the best path Ps.

A first step 610 includes receiving routing packets at the access node through at least one wireless route; each routing packet including route information that identifies the wireless route of the routing packet.

A second step 620 includes determining a success ratio of a number of successfully received routing packets versus a number of transmitted routing packets over a period of time T1, for each wireless route.

A third step 630 includes first selecting the wireless route having a greatest success ratio, and other wireless routes that have success ratios within a predetermined amount of the greatest success ratio.

A fourth step 640 includes determining an optimal wireless route based upon the first selected routes.

An embodiment includes the routing packets being beacons. Generally, the beacons are initially transmitted by at least one gateway. An embodiment includes the beacons being transmitted according to an 802.11 protocol. Generally, a predetermined number of routing packets (beacons) are transmitted from at least one gateway over a unit of time.

Figure 7:
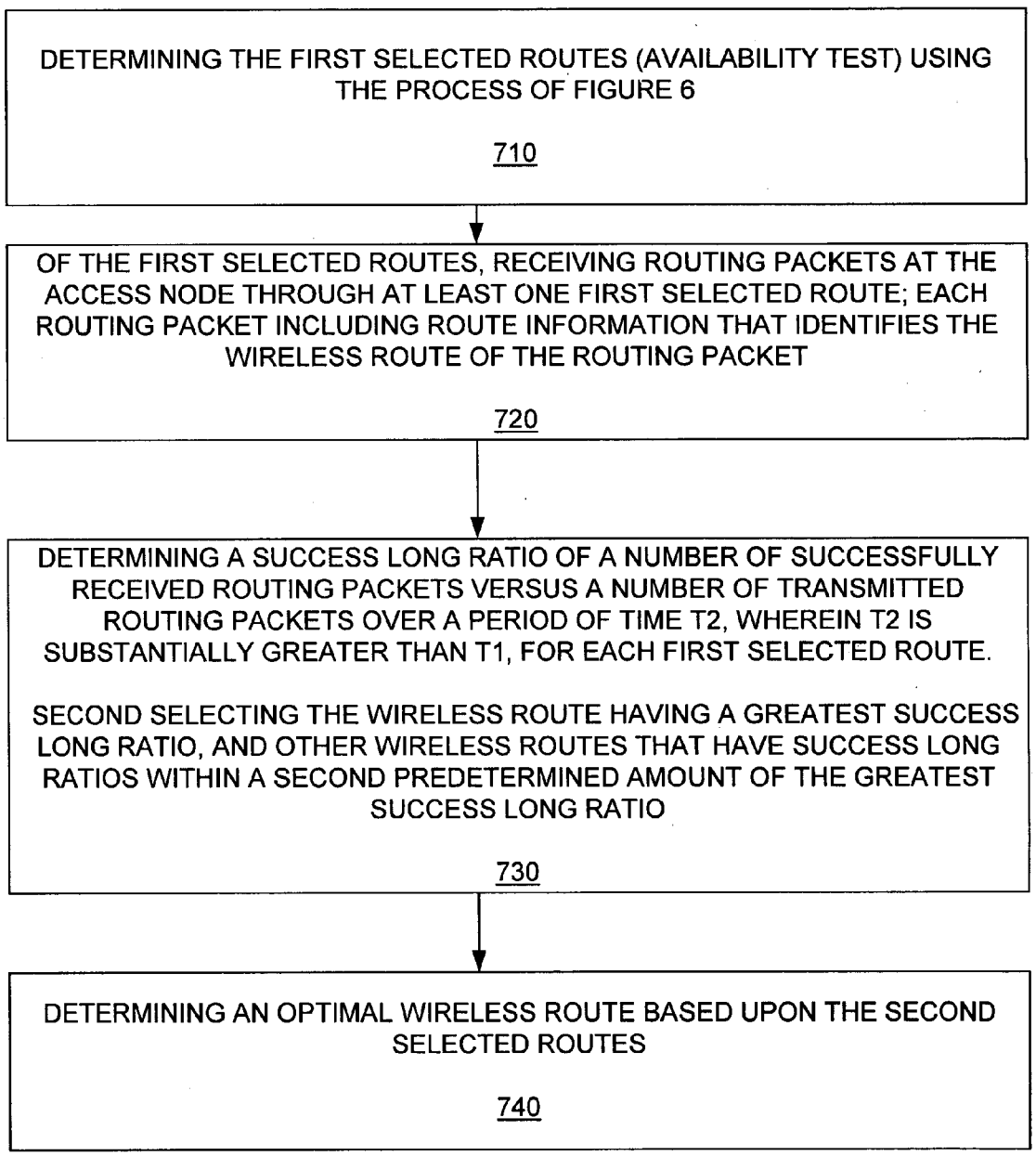
FIG. 7 is a flow chart showing acts according to another embodiment of the invention.

FIG. 7 is a flow chart showing acts according to another embodiment of the invention. Generally, the embodiment of FIG. 7 includes first and second screening or filtering tests. The screening separates available and consistent routes from routes that are not available or consistent.

Only the paths that pass the availability (short) test are considered for the consistency (long) test. The best long path P1 is the path that passing the short test Ps, and no path Pj exists in which QL(Pj) is greater than QL(Ps), in which QL( ) is the quality of the path. As will be described, the quality can be determined by determining a ratio of the number of successfully received packets versus the number of transmitted packets. Of these paths, only the paths Pi that have quality long figures QL(Pi) that are greater than QL(P2)−f2 (Q1(pi)) are considered to have passed the consistency (long) test. Any paths that do not pass this test are removed from consideration as a selected optimal path.

A first step 710 includes determining the first selected routes (availability test) using the process of FIG. 6.

A second step 720 includes of the first selected routes, receiving routing packets at the access node through at least one first selected route; each routing packet including route information that identifies the wireless route of the routing packet.

A third step 730 includes second selecting the wireless routes through a second screening measure, the second screening measure providing a criteria for allowing selection of wireless routes. An embodiment includes determining a success long ratio of a number of successfully received routing packets versus a number of transmitted routing packets over a period of time T2, wherein T2 is substantially greater than T1, for each first selected route. An embodiment includes second selecting the wireless route having a greatest success long ratio, and other wireless routes that have success long ratios within a second predetermined amount of the greatest success long ratio.

A fourth step 740 includes determining an optimal wireless route based upon the second selected routes.

Figure 8:
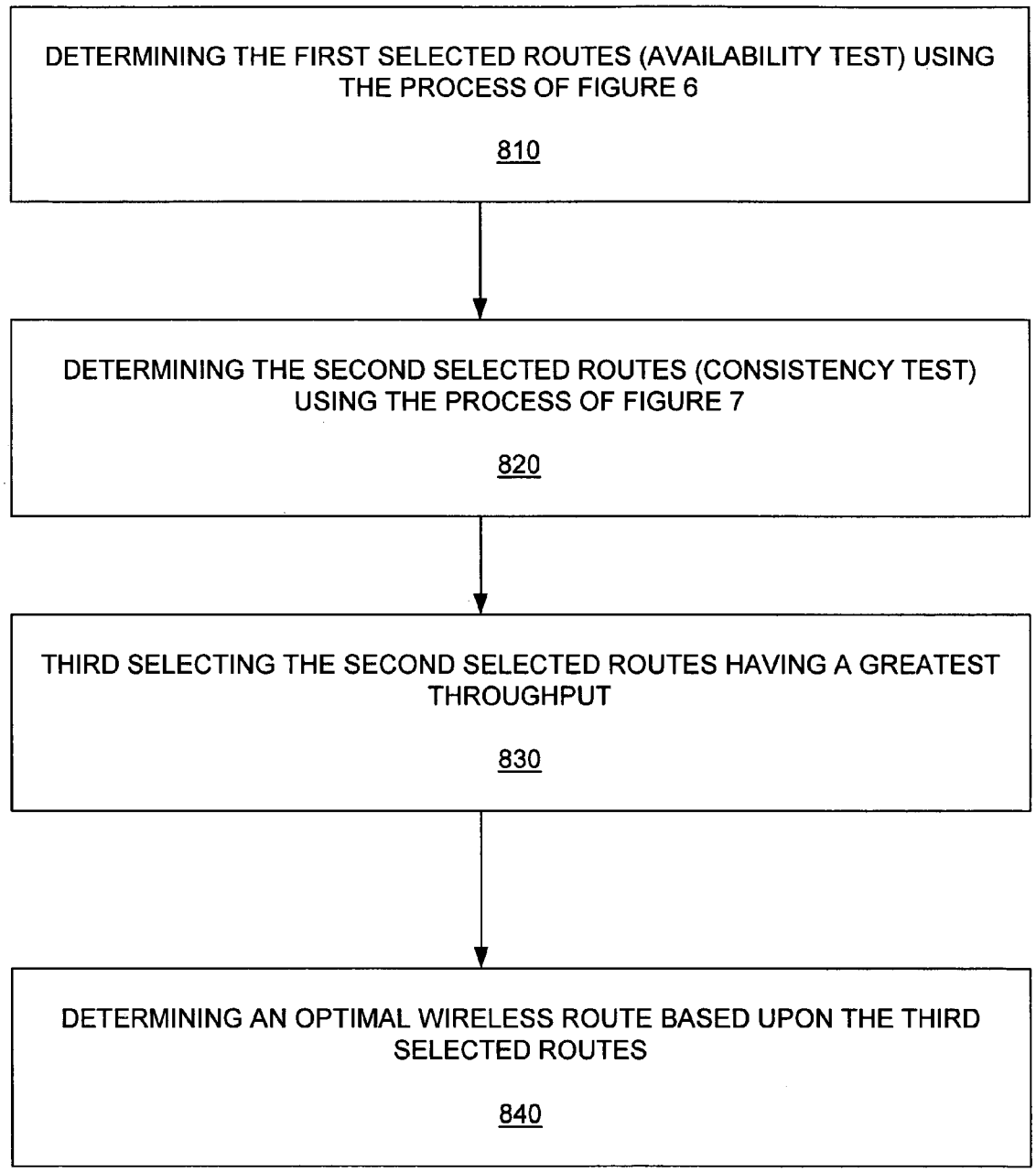
FIG. 8 is a flow chart showing acts according to another embodiment of the invention.

FIG. 8 is a flow chart showing acts according to another embodiment of the invention. The embodiment of FIG. 8 provides another screening test. This test generally determines a throughput of each of the available and consistent routes.

The throughput test can include computing the expected throughput for each path as a function of QS, QL, and/or the hop-count H. Other relevant variable can additionally be included in the throughput test.

A first step 810 includes determining the first selected routes (availability test) using the process of FIG. 6.

A second step 820 includes determining the second selected routes (consistency test) using the process of FIG. 7.

A third step 830 includes third selecting the second selected routes having a greatest throughput. Various methods can be used for determining the greatest throughput. An embodiment includes the path having the greatest throughput being the path that has the least number of hops.

A fourth step 840 includes determining an optimal wireless route based upon the third selected routes.

As previously described, the optimal path selection can be influenced by the default path. The default path is generally defined as the previously selected path. The default path get extra consideration as a future selected path. If the default path is among the paths that pass through the screening of the desired paths, generally, the default path is re-selected as the optimal path.

For the three part test shown in FIG. 8, if the third selected routes include a default routing path, then the default routing path is determined to be the optimal route. As previously described, the default routing path is generally defined as a previously determined optimal route.

For an embodiment, if the third selected routes do not include a default routing path, then selecting the default routing path if the success long ratio of the default routing path is greater than the success long ratios of the third selected routes.

For an embodiment, if the third selected routes do not include a default routing path, then selecting at least one of the third selected routes if the success long ratio of the default routing path is less than the success long ratios of the third selected routes.

Relationships between the thresholds for each of the above-described tests can be tuned to determine the relative emphasis placed on each test. For example, a small threshold in the long test biases selections towards consistent paths, while a large threshold permits paths to be compared to a larger degree on throughput.

Although specific embodiments of the invention have been described and illustrated, the invention is not to be limited to the specific forms or arrangements of parts so described and illustrated. The invention is limited only by the appended claims.

What is claimed is:

1. A method of determining an optimal route based upon path quality of routes to an access node of a wireless network, the method comprising:
   receiving routing packets at the access node through at least one wireless route; each routing packet including route information that identifies the wireless route of the routing packet;
   determining a success ratio of a number of successfully received routing packets versus a number of transmitted routing packets over a period of time T1, for each wireless route; and
   first selecting at least one of wireless route having a greatest success ratio, and other wireless routes that have success ratios within a predetermined amount of the greatest success ratio; and
   determining an optimal wireless route based upon at least one first selected route.

2. The method of determining an optimal route of claim 1, wherein the routing packets are beacons.

3. The method of determining an optimal route of claim 2, wherein the beacons are initially transmitted by at least one gateway.

4. The method of determining an optimal route of claim 2, wherein the beacons are transmitted according to an 802.11 protocol.

5. The method of determining an optimal route of claim 1, wherein a predetermined number of routing packets are transmitted from at least one gateway over a unit of time.

6. The method of determining an optimal route of claim 1, wherein determining an optimal wireless route based upon at least one first selected routes comprises:
   of the at least one first selected route, receiving routing packets at the access node through at least one first selected route; each routing packet including route information that identifies the wireless route of the routing packet;
   second selecting at least one first selected wireless routes through a second screening measure, the second screening measure providing a criteria for allowing selection of wireless routes; and
   determining an optimal wireless route based upon at least one second selected route.

7. The method of determining an optimal route of claim 6, wherein second selecting the wireless routes through a second screening measure comprises:
   determining a success long ratio of a number of successfully received routing packets versus a number of transmitted routing packets over a period of time T2, wherein T2 is substantially greater than T1, for each first selected route; and
   second selecting the wireless route having a greatest success long ratio, and other wireless routes that have success long ratios within a second predetermined amount of the greatest success long ratio.

8. The method of determining an optimal route of claim 6, wherein determining an optimal wireless route based upon at least one second selected routes comprises:
   third selecting at least one second selected route having a greatest throughput.

9. The method of determining an optimal route of claim 8, wherein the second selected routes having a greatest throughput are the second selected paths having a minimal number of wireless hops.

10. The method of determining an optimal route of claim 8, wherein if the at least one third selected route includes a default routing path, then the default routing path is determined to be the optimal route.

11. The method of determining an optimal route of claim 10, wherein the default routing path is a previously determined optimal route.

12. The method of determining an optimal route of claim 8, wherein if the at least one third selected route does not include a default routing path, then selecting the default routing path if the success long ratio of the default routing path is greater than the success long ratios of the third selected routes.

13. The method of determining an optimal route of claim 8, wherein if the at least one third selected route does not include a default routing path, then selecting at least one of the third selected routes if the success long ratio of the default routing path is less than the success long ratios of the third selected routes.

14. The method of determining an optimal route of claim 1, wherein determining an optimal wireless route based upon at least one first selected routes comprises:
   third selecting the at least one first selected route having a greatest throughput.

15. A method of determining an optimal route based upon path quality of routes to an access node of a wireless mesh network, the method comprising:
   receiving routing packets at the access node through at least one wireless route; each routing packet including route information that identifies the wireless route of the routing packet;
   first selecting at least one of wireless route having a greatest throughput; and
   determining a success ratio of a number of successfully received routing packets versus a number of transmitted routing packets over a period of time T1, for each first selected route;

second selecting at least one first wireless route having a greatest success ratio, and other first selected routes that have success ratios within a predetermined amount of the greatest success ratio; and determining an optimal wireless route based upon at least one second selected route.

16. The method of determining an optimal route of claim 15, wherein determining an optimal wireless route based upon at least one second selected routes comprises:

of the at least one second selected route, receiving routing packets at the access node through at least one second selected route; each routing packet including route information that identifies the wireless route of the routing packet;

determining a success long ratio of a number of successfully received routing packets versus a number of transmitted routing packets over a period of time T2, wherein T2 is substantially greater than T1, for each second selected route;

third selecting at least one wireless route having a greatest success long ratio, and other wireless routes that have success long ratios within a second predetermined amount of the greatest success long ratio; and determining an optimal wireless route based upon at least one third selected route.

17. A wireless access node comprising:

means for receiving routing packets at the access node through at least one wireless route; each routing packet including route information that identifies the wireless route of the routing packet;

means for determining a success ratio of a number of successfully received routing packets versus a number of transmitted routing packets over a period of time T1, for each wireless route; and means for first selecting at least one wireless route having a greatest success ratio, and other wireless routes that have success ratios within a predetermined amount of the greatest success ratio; and means for determining an optimal wireless route based upon at least one first selected route.

18. The wireless access node of claim 17, wherein means for determining an optimal wireless route based upon at least one first selected route comprises:

of the at least one first selected route, means for receiving routing packets at the access node through at least one first selected route; each routing packet including route information that identifies the wireless route of the routing packet;

means for determining a success long ratio of a number of successfully received routing packets versus a number of transmitted routing packets over a period of time T2, wherein T2 is substantially greater than T1, for each first selected route;

means for second selecting at least one first selected wireless route having a greatest success long ratio, and other wireless routes that have success long ratios within a second predetermined amount of the greatest success long ratio;

means for determining an optimal wireless route based upon at least one second selected route.

19. The wireless access node of claim 17, wherein means for determining an optimal wireless route based upon at least one second selected route comprises:

means for third selecting at least one second selected route having a greatest throughput.

20. A method of determining an optimal route based upon path quality of routes to an access node of a wireless mesh network, the method comprising:

receiving routing packets at the access node through at least one wireless route; each routing packet including route information that identifies the wireless route of the routing packet;

determining a success ratio of a number of successfully received routing packets versus a number of transmitted routing packets over a period of time T1, for each wireless route; and first selecting at least one wireless routes having a greatest success ratio, and other wireless routes that have success ratios within a predetermined amount of the greatest success ratio;

of the at least one first selected route, receiving routing packets at the access node through at least one first selected route; each routing packet including route information that identifies the wireless route of the routing packet;

determining a success long ratio of a number of successfully received routing packets versus a number of transmitted routing packets over a period of time T2, wherein T2 is substantially greater than T1, for each first selected route;

second selecting at least one first selected wireless route having a greatest success long ratio, and other wireless routes that have success long ratios within a second predetermined amount of the greatest success long ratio;

third selecting at least one second selected route having a greatest throughput; and determining an optimal wireless route based upon at least one third selected route.

21. The method of determining an optimal route of claim 20, wherein if the at least one third selected route includes a default routing path, then the default routing path is determined to be the optimal route.

22. The method of determining an optimal route of claim 21, wherein the default routing path is a previously determined optimal route.

23. The method of determining an optimal route of claim 20, wherein if the at least one third selected route does not include a default routing path, then selecting the default routing path if the success long ratio of the default routing path is greater than the success long ratios of the third selected routes.

24. The method of determining an optimal route of claim 20, wherein if the at least one third selected route does not include a default routing path, then selecting at least one of third selected route if the success long ratio of the default routing path is less than the success long ratios of the at least one third selected route.

* * * * *